No. 698,390. Patented Apr. 22, 1902.
T. H. BRIGG.
POLE HEAD DEVICE FOR VEHICLES.
(Application filed July 12, 1901.)
(No Model.)

Witnesses
Thomas Kilpatrick
C W Mann

Inventor
Thomas Hargreaves Brigg
by Alexander & Co
Attorneys

United States Patent Office.

THOMAS HARGREAVES BRIGG, OF LONDON, ENGLAND, ASSIGNOR OF SEVEN-TWENTIETHS TO CHARLES WILLIAM WALKER, OF BRADFORD, YORKSHIRE, ENGLAND.

POLE-HEAD DEVICE FOR VEHICLES.

SPECIFICATION forming part of Letters Patent No. 698,390, dated April 22, 1902.

Application filed July 12, 1901. Serial No. 68,062. (No model.)

*To all whom it may concern:*

Be it known that I, THOMAS HARGREAVES BRIGG, a subject of the King of Great Britain and Ireland, and a resident of London, England, have invented a certain new and useful Improvement in Pole-Head Devices for Carriages and other Vehicles, (for which I have filed an application for British Patent No. 22,983, dated December 15, 1900;) and I do hereby declare the following to be a full, clear, and exact description of the same.

This invention relates to improved means of connecting two or more draft-animals driven abreast to the poles of carriages and other vehicles, its object being to effect such connection in such manner as to allow the animals such liberty of lateral movement on each side of their normal draft positions that when in draft they will run naturally free, straight, and parallel and independent of and free from interference with each other and subject only to their natural movements and so that when retarding or backing the vehicle their actions thereon will be caused to be effected in planes parallel with the pole at whatever distance from the latter they may happen to be when pulled up, so that the animals will not, either when pulling or when backing, be subject to any interference by swaying movements of the pole or to any lateral thrust or pull tending to cause them to exert a counter thrust or pull or to throw them off their feet, but will be enabled to run naturally free, straight, and parallel and to exercise their stopping or backing action to the best advantage under all circumstances and, moreover, can be immediately released should they fall.

To this end the invention is characterized by connecting the animals to the pole by a backing arm or arms connected to the pole and projecting considerably beyond the planes of the animals' normal draft positions and by yoking the animals' collars to the arm or arms in such manner that the yoking connections can freely slide along the latter and can be readily released therefrom, as hereinafter more particularly described with reference to the accompanying drawings, on which—

Figure 1:
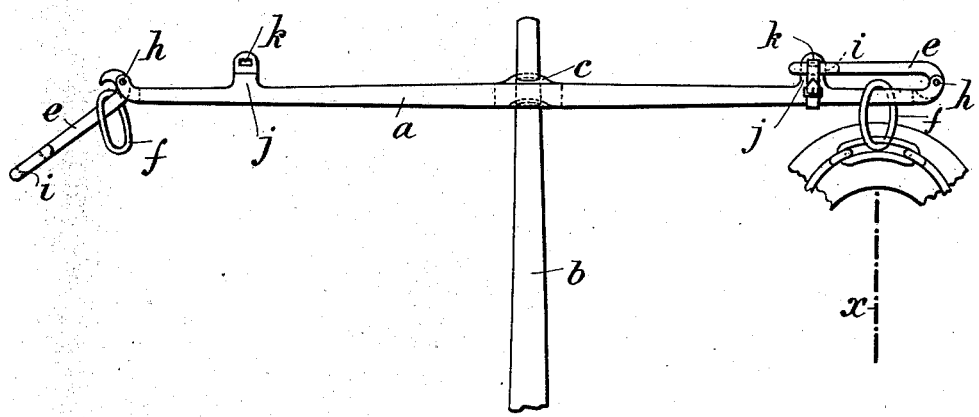
Figure 2:
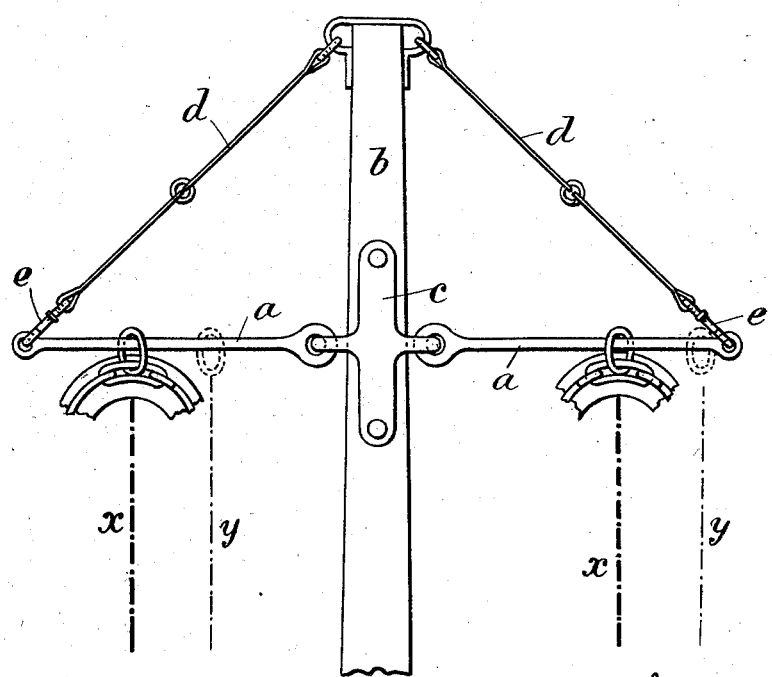

Figures 1 and 2 represent plan views of different arrangements of the apparatus, the dotted lines $x$ representing the normal draft positions of the draft-animals, and the dotted lines $y$ representing other positions the animals may assume differently distant from the pole.

In the arrangement of Fig. 1 a single backing-arm $a$ is used for two animals abreast and is connected to the pole $b$ by a carrier $c$, suitably secured to the latter.

In the arrangement of Fig. 2 two separate backing-arms $a$ are used, one for each of two animals abreast, and are each pivotally connected to a carrier $c$ and secured to the pole end by a pole-piece $d$, so as to be held at right angles thereto when the animals are retarding or backing the vehicle.

The arms or arm $a$ extend considerably beyond the planes $x$ of the animals' centers when in their normal draft positions and (*vide* Fig. 1) are formed with slip-hook ends $e$, which enable the kidney-link rings $f$ of the animals' collars to be easily yoked or slid from off the arms and provide for a wide extent of travel of the rings on each side of the animals' normal draft positions.

The slip-hook ends are pivoted to the arms at $h$ and slotted at $i$ and there adapted to engage with a stud $j$, rising from the arm and slotted at $k$, and to be locked to the arm $a$ when the animals are yoked to the vehicle by a pin or strap $l$, passed through the slot $k$, and which upon being removed allows of the animals being instantly released should they fall or should occasion otherwise necessitate, or (*vide* Fig. 2) the backing-arms and the pole-pieces holding them to the pole end may be connected by slip or spring hooks $e$, which serve the twofold purpose of allowing of the ready connection and disconnection of the pole-pieces and arms and of the animals being readily yoked to the arms with liberty of free movement therealong on each side of the animals' normal draft positions and unyoked therefrom. The improved connection thus allows the animals such liberty of lateral movement on each side of their normal draft positions that when in draft they will run naturally free, straight, and parallel and independent of and free from interference with each other and subject only to their natural movements and will not be subject to any lateral restraint or interference tending to cause them to offer any opposing action or to the liability of their equilibrium being interfered with by lateral swaying of the pole, so that all causes which in existing connections of draft-animals to carriage-poles render the animals liable to be thrown will be avoided, while when the animals are retarding or backing the vehicle the pull of the collar connections against the fore parts of the backing-arms, in alinement at the time with their centers, will necessarily cause their retarding or backing action on the vehicle to be effected in planes parallel with the pole at whatever distance therefrom the animals may happen to be when pulled up, and, moreover, should the animals fall the improved connection will enable them to be readily released.

What I claim as my invention, and desire to secure by Letters Patent, is—

1. The combination with a carriage-pole of a backing arm or arms supported by the pole and projecting forward of the animals' collars considerably beyond the planes of the animals' normal draft positions and formed with slip-hook ends serving to enable the animals' collar-rings to be easily yoked to and unyoked from the arms and to provide for a wide extent of free travel of the collar-rings along the arms on each side of the animals' normal draft positions, so as to enable the animals to run straight and parallel and to cause their retarding or backing actions on the vehicle to be effected in planes parallel to the pole at whatever distance therefrom they may happen to be when pulled up, as set forth.

2. The combination with a vehicle-pole, of an arm serving as a backing attachment, and a collar-connecting device, the arm being connected to the pole and extending considerably beyond the plane of the animal's normal draft position, and the connecting device having unrestrained free play along the arm to the extent of the animal's liberty of lateral movement on each side of its normal position, so enabling the animal to run straight and parallel with the pole and to exert its backing action on the vehicle in a plane parallel with the pole at whatever distance therefrom it may happen to be when pulled up, as set forth.

3. The combination with a vehicle-pole, of an arm connected thereto and extending considerably beyond the plane of the animal's normal draft position, a collar-connecting ring on said arm having unrestrained free play along the same to the extent of the animal's liberty of lateral movement on each side of its normal position, and a slip-hook at the end of the arm, whereby the animal can be readily yoked and unyoked, can run straight and parallel with the pole and exert its backing action on the vehicle in a plane parallel with the pole at whatever distance therefrom it may happen to be when pulled up.

In testimony whereof I have signed this specification in the presence of two subscribing witnesses.

THOMAS HARGREAVES BRIGG.

Witnesses:
M. H. BAUGH,
RALPH JENKINS.